Oct. 25, 1955   W. B. FRANCIS, JR., ET AL   2,721,434
ROTARY CUTTER ATTACHMENT FOR TRACTORS
Filed Feb. 8, 1952   2 Sheets-Sheet 1

INVENTORS
WILLIAM B. FRANCIS, JR.
FRED W. ARNOLD, JR.
BY
McMorrow, Berman + Davidson
ATTORNEYS.

Oct. 25, 1955   W. B. FRANCIS, JR., ET AL   2,721,434
ROTARY CUTTER ATTACHMENT FOR TRACTORS
Filed Feb. 8, 1952   2 Sheets-Sheet 2

INVENTORS
WILLIAM B. FRANCIS, JR.
FRED W. ARNOLD, JR.

BY
McMorrow, Berman & Davidson
ATTORNEYS

United States Patent Office 2,721,434
Patented Oct. 25, 1955

2,721,434

ROTARY CUTTER ATTACHMENT FOR TRACTORS

William B. Francis, Jr., and Fred W. Arnold, Jr., Davisboro, Ga.

Application February 8, 1952, Serial No. 270,674

2 Claims. (Cl. 56—25.4)

This invention relates to harvesting apparatus, and more particularly to a rotary cutter attachment for tractors.

A main object of the invention is to provide a novel and improved rotary blade cutter attachment for tractors, said attachment being simple in construction, being easy to install, and being safe to use.

A further object of the invention is to provide an improved rotary cutter attachment for tractors, said attachment being of the horizontal blade type, and being arranged for installation at the rear of the tractor between the tractor rear wheels and arranged to be driven by the power take-off shaft of the tractor, the improved attachment involving inexpensive parts, being rugged in construction, and providing an efficient cutting action over a wide area.

Further objects and advantages of the invention will become apparent from the following description and claims and from the accompanying drawings, wherein:

Figure 1:
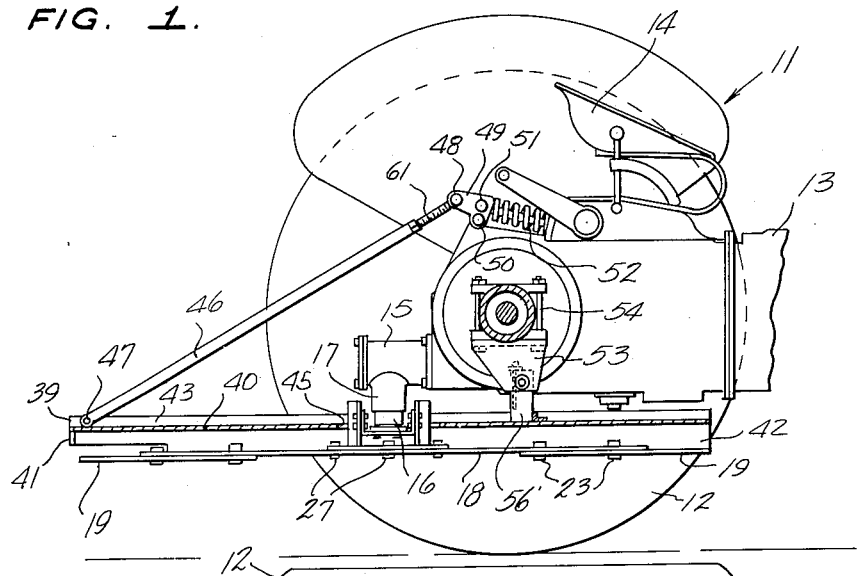
Figure 1 is a central longitudinal, vertical, cross-sectional view taken through the rear portion of a tractor equipped with an improved rotary cutter attachment according to the present invention.
Figure 2:
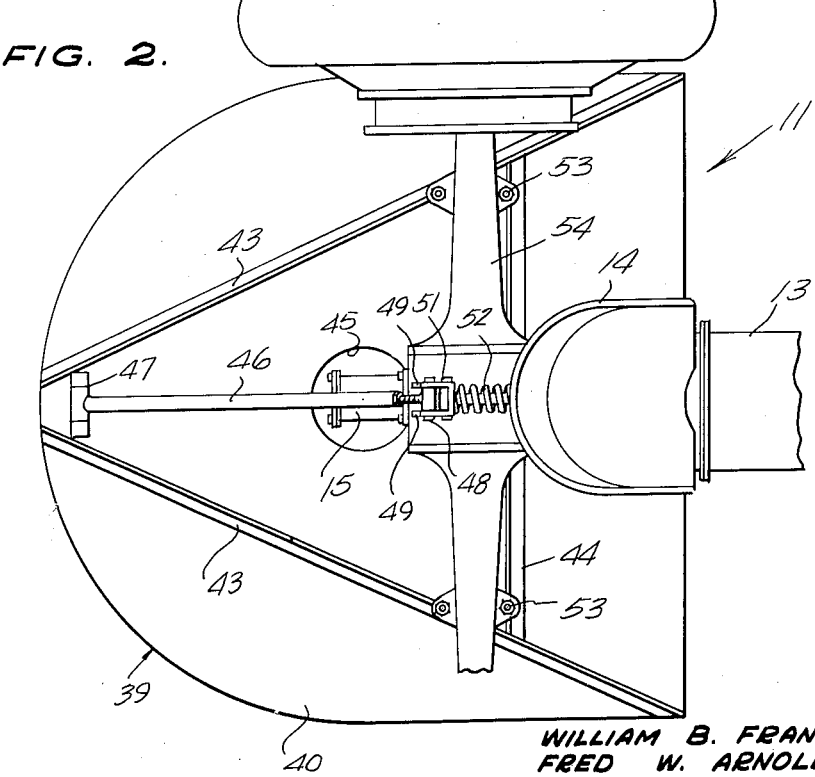
Figure 2 is a fragmentary top plan view of the rear portion of the tractor of Figure 1, showing the improved rotary cutter attachment.
Figure 3:
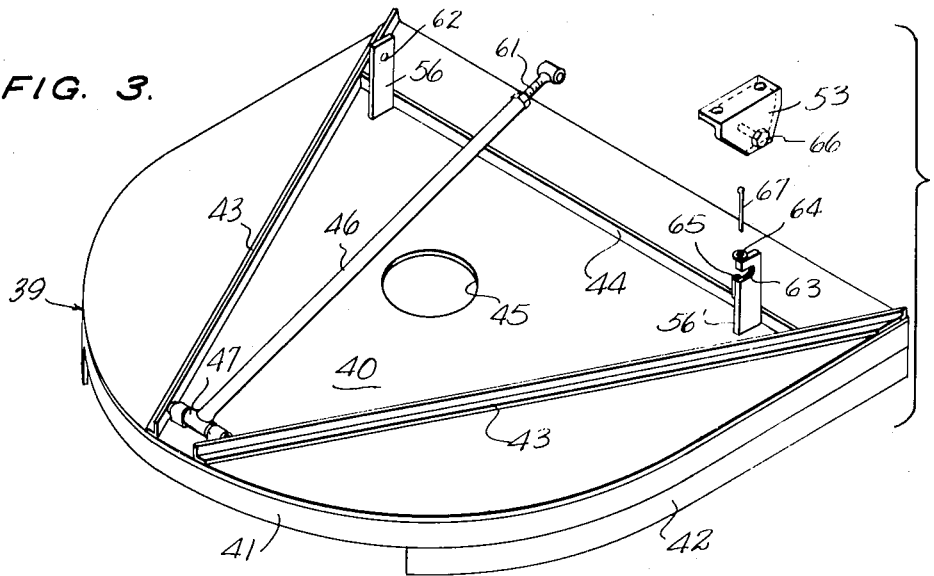
Figure 3 is a perspective view of the shield portion of the attachment and one of its suspension bolts and brackets.

Referring to the drawings, and more particularly to Figures 1 and 2, 11 designates a conventionad tractor having the rear wheels 12 and the frame 13. Mounted on the frame 13 is the operator's seat 14. The power take-off shaft of the tractor projects from the rear end of the frame 13 and is located in a housing 15, said power take-off shaft being provided with a depending shaft extension 16 extending at right angles to the axis of the housing 15 and being supported in a right-angled extension 17 of said housing 15.

Figure 4:
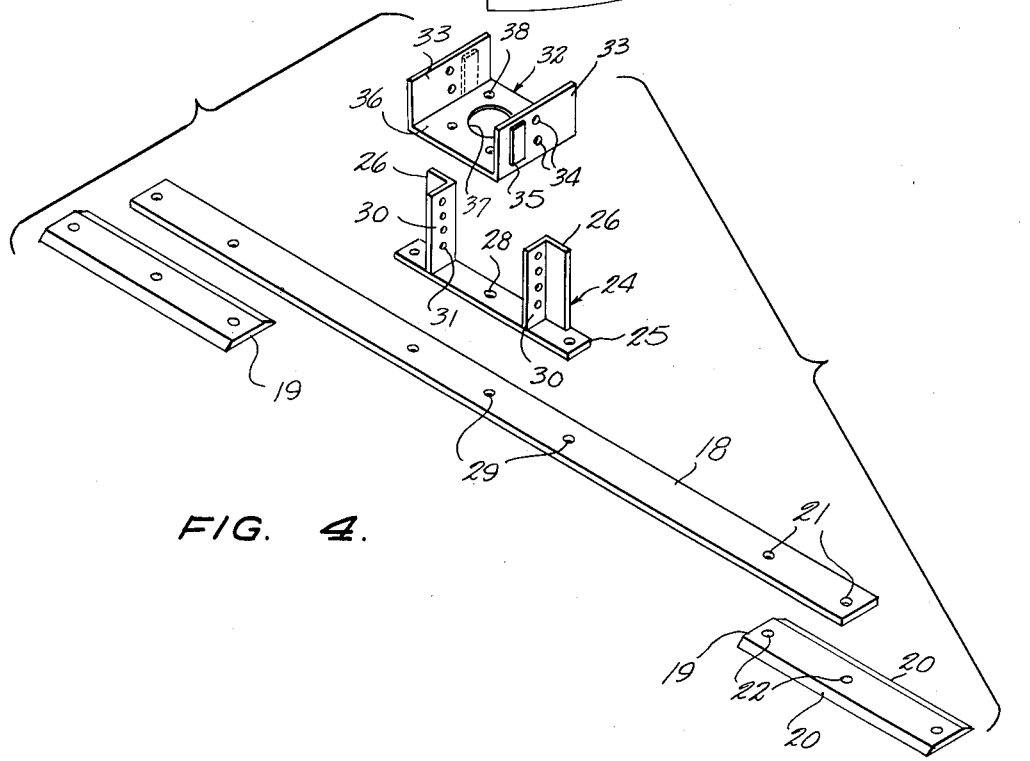
Figure 4 is an enlarged perspective view of the components of the rotary blade member of the attachment, said components being shown in disassembled positions.

Designated at 18 is a horizontally extending bar member of substantially rigid bar stock having secured to its opposite end portions the respective blade members 19, 19, said blade members having the opposite longitudinally extending sharp edges 20, 20. As shown in Figure 4, the bar member 18 is provided near its ends with the pair of openings 21, 21, and the blade members 19 are provided with the series of openings 22 spaced apart by the same distance as the openings 21, 21, whereby the blade members 19 may be secured to the end portions of the bar member 18 at the openings 21, 21 at various different locations along said end portions. The blade elements 19 are secured to the end portions of the bar member 18 by means of a pair of bolts 23, 23 extending through the openings 21, 21 and through a selected pair of openings 22 on the blade element 19.

Designated at 24 is a bracket member having a flat base portion 25 and a pair of upstanding angle portions 26, 26 rigidly secured to said flat portion 25. The base portion 25 is centrally secured to the bar member 18 by bolts 27 extending through respective openings 28 and 29 provided in the base portion 25 and the central portion of the bar member 18, as shown in Figure 4. The angle bars 26, 26 are symmetrically located on opposite sides of the center of the base portion 25, and are formed on their facing parallel portions 30, 30 with the uniformly spaced, vertically aligned openings 31, as shown in Figure 4. Designated at 32 is a U-shaped bracket member having the upstanding side arms 33, 33 adapted to fit between the parallel flanges 30, 30 of the bar members 26, 26, each side arm 33 being formed with a pair of openings 34 registrable with a selected pair of openings 31 on one of the upstanding angle bars 26. The bracket member 32 may thus be secured in adjusted vertical position relative to the base portion 25 of the bracket member 24 by means of bolts extending through the aligned openings 31 and 34 of the angle bars 24 and the flanges 33. Welded, or otherwise rigidly secured to each flange 33 is a rectangular block 35 disposed adjacent the securing openings 34 thereof and adapted to abut with a vertical edge of the associated angle bar 26 to lock the bracket member 32 against rotation relative to the bracket member 24 when said bracket member 32 is secured to the bracket member 24 in the manner above described.

The bight portion of the bracket member 32, shown at 36, is formed with a central opening 37. Said bight portion is also formed with a plurality of openings 38 disposed around the opening 37. As shown in Figure 1, the horizontal blade structure is secured to the end of the power take-off shaft extension 16 by fastening the bight portion 36 of the bracket member 32 to the end of said shaft extension. This may be accomplished by employing a plurality of bolts extending through the openings 38 and threadedly engaged in the end of the depending shaft extension 16, thus rigidly securing the bracket member 32 to the end of the shaft extension. The bracket member 24 may be secured to the bracket member 32 in adjusted position, as above described, whereby the bar 18, secured to base portion 25 of bracket member 24, is connected to the shaft extension 16 and is supported at a desired elevation above the ground.

Designated at 39 is a shield member comprising a flat, substantially horizontally arranged main body portion 40 dimensioned so as to cover the rotating blade structure comprising bar 18 and blade elements 19, 19, said main body 40 being provided with a depending peripheral flange 41 extending continuously along its side and rear edges, and with further depending flange elements 42 at the sides of the shield which may be extensions of the side portions of the peripheral flange 41. The main body 40 of the shield is stiffened by the respective diagonally extending angle bars 43, 43 welded to said main body and converging toward the rear end thereof, and by the transversely extending angle bar 44 welded to the main body 40 between the forward portions of the reinforcing bars 43, 43. The main body 40 is provided with the circular opening 45 through which the upstanding bracket 24 is adapted to extend, as shown in Figure 1, sufficient clearance being provided to allow said bracket to rotate freely in the opening 45. Designated at 46 is the adjustable inclined supporting rod which is pivotally connected to the rear end portion of the shield 39 at 47. The forward end of the rod 46 is provided with the threaded adjusting rod 61 which is pivotally connected at 48 to a lever member 49 which is pivotally connected at 50 to the rear portion of frame 13 and which is connected at 51 to the supporting structure for the seat 14 by a spring 52, the seat-supporting structure being located forwardly of the connection 50, whereby the spring 52 exerts a spring tension on the lever 49 which supports the shield 39 in overlying position relative to the horizontally extending blade structure defined by bar elements 19, 19. The forward portion of the shield is supported by a pair of depending bracket members 53, 53 secured to the tractor axle housing 54, said bracket members being pivotally secured to the top ends of upstanding arms 56 and 56' rigidly secured to the forward portion of shield 39. The arm 56 is apertured at its top end, as shown at 62, whereby it is pivotally connected to its associated bracket member 53 by a transverse bolt. Arm 56' is formed with a notch 63. A washer 64 is welded to the top end of arm 56', and welded to said arm below the notch 63 and in alignment with washer 64 is a sleeve 65. The attaching bolt 66 carried by the associated bracket member 53 is engaged in notch 63 and is retained therein by inserting a pin 67 vertically through the washer 64 and sleeve 65.

It will be readily apparent from the above description that the shield 39 will be resiliently supported in overlying relation to the horizontal rotating blade structure and may be adjusted in position in accordance with the adjusted elevated position of said horizontal blade structure.

While a specific embodiment of an improved rotary cutter attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a tractor having a rear axle housing and a rear power take-off including a depending shaft, a horizontal rotary cutter, bracket means arising from said cutter and supportably connected with said shaft, and a horizontal shield overlying said cutter and mounted on said axle housing, said shield having a central opening through which said bracket means extends, pivot means mounting said shield on said axle housing, and yieldable means connected to a part of the tractor and to said shield at a point rearwardly of said pivot means.

2. In combination, a tractor having a rear axle housing and a power take-off projecting rearwardly beyond said axle housing, said power take-off including a vertical shaft depending to a point below said axle housing, a horizontal shield positioned beneath the axle housing and reaching rearwardly beyond said power take-off, means mounting said shield on said axle housing, support means secured to and extending between another part of the tractor and a rear part of said shield behind the power take-off, said shield being imperforate except for an opening provided therein in the region of said vertical shaft, bracket means secured to said shaft and depending through said opening, and a horizontal rotary cutter beneath said shield and secured to said bracket means.

References Cited in the file of this patent

UNITED STATES PATENTS

| | | |
|---|---|---|
| 2,471,367 | Cavaness | May 24, 1946 |
| 2,483,683 | Wells et al. | Oct. 4, 1949 |
| 2,513,223 | Winbourne | June 27, 1950 |
| 2,592,991 | Yeager et al. | Apr. 15, 1952 |
| 2,612,017 | Jarmin | Sept. 30, 1952 |
| 2,634,571 | Lawrence et al. | Apr. 14, 1953 |